(12) United States Patent
Fukumura et al.

(10) Patent No.: US 8,346,510 B2
(45) Date of Patent: Jan. 1, 2013

(54) CONTINUOUSLY-ARRANGED SENSOR SYSTEM, NETWORK UNIT, AND SENSOR UNIT

(75) Inventors: Koji Fukumura, Osaka (JP); Masashi Kawanaka, Osaka (JP)

(73) Assignee: Keyence Corporation, Osaka (JP)

( * ) Notice: Subject to any disclaimer, the term of this patent is extended or adjusted under 35 U.S.C. 154(b) by 422 days.

(21) Appl. No.: 12/634,801

(22) Filed: Dec. 10, 2009

(65) Prior Publication Data

US 2010/0185418 A1    Jul. 22, 2010

(30) Foreign Application Priority Data

Jan. 19, 2009  (JP) .................................... 2009-8564

(51) Int. Cl.
*G06F 15/00* (2006.01)
(52) U.S. Cl. ........................................ 702/188
(58) Field of Classification Search .................. 702/188
See application file for complete search history.

(56) References Cited

U.S. PATENT DOCUMENTS

| | | | |
|---|---|---|---|
| 5,003,169 A | 3/1991 | Sakaguchi et al. | |
| 5,818,123 A | 10/1998 | Iwasaki et al. | |
| 6,211,784 B1 | 4/2001 | Nishide | |
| 7,006,942 B2 * | 2/2006 | Fukumura | 702/122 |
| 7,091,854 B1 * | 8/2006 | Miao | 340/539.26 |
| 7,411,319 B2 | 8/2008 | Suhara et al. | |
| 2010/0308210 A1 * | 12/2010 | Saitou et al. | 250/208.2 |

FOREIGN PATENT DOCUMENTS

| | | |
|---|---|---|
| JP | 09-064712 | 3/1997 |
| JP | 09-083330 | 3/1997 |
| JP | 09-097658 | 4/1997 |
| JP | 09-161631 | 6/1997 |
| JP | 09-252242 | 9/1997 |
| JP | 2000-224202 | 8/2000 |
| JP | 2003-097983 | 4/2003 |
| JP | 2003-108204 | 4/2003 |
| JP | 2003-110415 | 4/2003 |
| JP | 2003-110416 | 4/2003 |
| JP | 2004-295276 | 10/2004 |
| JP | 2005-147722 | 6/2005 |
| JP | 2006-133944 | 5/2006 |
| JP | 2006-170920 | 6/2006 |

* cited by examiner

*Primary Examiner* — Cindy H Khuu
(74) *Attorney, Agent, or Firm* — Kilyk & Bowersox, P.L.L.C.

(57) ABSTRACT

A continuously-arranged sensor system is provided that can recognize a time of a determination signal provided by each sensor unit so that a host control apparatus can use the time to perform timing control. The continuously-arranged sensor system includes a network unit and a plurality of sensor units, which are connected by a serial transmission line. In accordance with a command sent from the network unit, each sensor unit transmits the determination signal to the network unit via the serial transmission line. The network unit stores the time information and the determination information to a table memory.

10 Claims, 14 Drawing Sheets

FIG. 4A

| UPDATE TIME | |
|---|---|
| #1 | ON/OFF |
| #2 | ON/OFF |
| #3 | ON/OFF |
| #4 | ON/OFF |
| ⋮ | ⋮ |
| #16 | ON/OFF |

FIG. 4B

| #1 | ON/OFF | CHANGE TIME |
|---|---|---|
| #2 | ON/OFF | CHANGE TIME |
| #3 | ON/OFF | CHANGE TIME |
| #4 | ON/OFF | CHANGE TIME |
| ⋮ | ⋮ | ⋮ |
| #16 | ON/OFF | CHANGE TIME |

FIG. 4C

| # 1  | RISING TIME | FALL TIME |
|------|-------------|-----------|
| # 2  | RISING TIME | FALL TIME |
| # 3  | RISING TIME | FALL TIME |
| # 4  | RISING TIME | FALL TIME |
| ⋮    | ⋮           | ⋮         |
| # 16 | RISING TIME | FALL TIME |

FIG. 4D

| # 1  | ON/OFF | RISING TIME | FALL TIME |
|------|--------|-------------|-----------|
| # 2  | ON/OFF | RISING TIME | FALL TIME |
| # 3  | ON/OFF | RISING TIME | FALL TIME |
| # 4  | ON/OFF | RISING TIME | FALL TIME |
| ⋮    | ⋮      | ⋮           | ⋮         |
| # 16 | ON/OFF | RISING TIME | FALL TIME |

FIG. 12

| UPDATE TIME | |
|---|---|
| # 1 | ON/OFF |
| # 2 | ON/OFF |
| # 3 | ON/OFF |
| # 4 | ON/OFF |
| ⋮ | ⋮ |
| # 1 6 | ON/OFF |
| # 1 | ON/OFF |
| # 2 | ON/OFF |
| # 3 | ON/OFF |
| # 4 | ON/OFF |
| ⋮ | ⋮ |
| # 1 6 | ON/OFF |

14-1 spans rows #1 through #16 (first block).
14-2 spans rows #1 through #16 (second block).

CONTINUOUSLY-ARRANGED SENSOR SYSTEM, NETWORK UNIT, AND SENSOR UNIT

CROSS-REFERENCE TO RELATED APPLICATIONS

The present application claims foreign priority based on Japanese Patent Application No. 2009-8564, filed Jan. 19, 2009, the contents of which is incorporated herein by reference.

BACKGROUND OF THE INVENTION

1. Field of the Invention

The present invention relates to a continuously-arranged sensor system for monitoring a state of an object to be detected, and also relates to a network unit and a sensor unit used for the continuously-arranged sensor system.

2. Description of the Background Art

In a manufacturing process in an automated manufacturing line, a process state of a workpiece is monitored in order to reliably process the workpiece. Therefore, in the automated manufacturing line, many sensors are arranged in proximity to the workpiece (object to be detected) so as to monitor the process state, and the workpiece is processed while a determination signal of each sensor is monitored.

In this kind of sensor system, it is cumbersome to prepare wirings between many sensors and a control apparatus of the sensors. Therefore, a continuously-arranged sensor system is known and utilized, in which these apparatuses are made into units and each unit is connected by physically coupling each unit, so that wirings between the units are completed at a time. In the continuously-arranged sensor system, many sensor units are continuously arranged in proximity to a workpiece, and many sensor heads such as optical fibers connected to each sensor unit are arranged in proximity to a portion of a workpiece to be monitored. In the continuously-arranged sensor system, a detection signal output from each sensor unit is monitored by a host control apparatus via a network unit.

Japanese Patent Application Laid-Open No. 2004-295276 describes a continuously-arranged sensor system for transmitting a sensor determination signal from each sensor unit to a network unit in real time, wherein two transmission paths, i.e., a parallel transmission and a serial transmission, are prepared as a method for transmitting other sensor information.

According to this configuration, since a sensor detection signal provided by each sensor unit is respectively independently transmitted via the parallel transmission path to the network unit side, the sensor detection signal can be transmitted to the network unit side without delay. Therefore, the workpiece can be operated at a fast speed. Further, a centralized control such as follows can be achieved: various kinds of sensor information such as the amount of received light and thresholds of sensors are transmitted to the network unit side as digital data, and a host control apparatus centrally manages the information. Alternatively, an instruction signal is transmitted from the host control apparatus or the network unit to each sensor unit so as to change controls and settings of light emitting timing of a sensor head in each sensor unit.

Japanese Patent Application Laid-Open No. 2003-97983 suggests a sensor system in which a plurality of sensor amplifiers and a sensor amplifier management apparatus are coupled via data communication.

SUMMARY OF THE INVENTION

The configuration described in Japanese Patent Application Laid-Open No. 2004-295276 allows the determination signal of each sensor unit to be transmitted via the network unit to the host control apparatus through the parallel transmission line without delay. However, the more sensor units are arranged, the more wirings should be connected, and therefore, there is a limitation on the number of sensors that can be connected.

As shown in Japanese Patent Application Laid-Open No. 2003-97983, when the determination signal of the sensor is transmitted as a serial signal, a delay in time occurs in the transmission of the determination signal to the host control apparatus. Therefore, there is a drawback in that it is difficult for the host control apparatus to use the determination signal of each sensor.

In some cases, a continuously-arranged sensor system is required of an immediacy in obtaining signals from the sensor unit. But in other cases, the continuously-arranged sensor system is not required of such immediacy, and it is sufficient for the continuously-arranged sensor system to only eliminate a synchronization deviation between a signal from the sensor unit and other signals. For example, a case is assumed where the host control apparatus is connected to the continuously-arranged sensor system so as to control various kinds of objects. In such case, if a time taken to obtain a determination signal of each sensor unit can be recognized, a processing for eliminating a synchronization deviation may be achieved while an object is controlled by way of an application on the host control apparatus.

The present invention is made in view of such possibility. It is the object of the present invention to provide a continuously-arranged sensor system including a network unit simultaneously storing a detection signal of a sensor and time information thereof, so that the continuously-arranged sensor system can provide the information in response to a request from a host control apparatus, and to provide the network unit and a sensor unit used in this sensor system.

In order to solve this problem, the continuously-arranged sensor system of the present invention is a continuously-arranged sensor system including: a network unit connected to a host control apparatus; and at least one or more sensor units, wherein the network unit and any one of the sensor units are physically connected with each other, and the sensor units are physically connected with each other, wherein the sensor unit includes: a sensor unit for outputting a detection signal in accordance with a physical quantity detected from an object; a control unit for generating a determination signal upon comparing the detection signal with a predetermined threshold value, and transmitting the determination signal to the network unit; a connection unit for connecting to any one of the adjacent network unit and the adjacent sensor unit; and a transmission unit for transmitting at least the determination signal, wherein the network unit includes: a connection unit for connecting to any one of the sensor units that is adjacent to the network unit; a time measuring unit for outputting a current time; a transmission unit for receiving at least the determination signal; a table memory for memorizing time information of the determination signal sent from each of the sensor units; and a control unit for receiving the determination signal of the sensor sent from the coupled sensor unit, and storing, to the table memory, current time information obtained from the time measuring unit with respect to the sensor determination signal.

The transmission unit of the sensor unit may be a serial transmission unit for transmitting and receiving a serial signal constituted by a signal including a plurality of bits, and the transmission unit of the network unit may be a serial transmission unit for transmitting and receiving a serial signal constituted by a signal including a plurality of bits.

The transmission unit of the sensor unit may be a parallel transmission unit for transmitting the determination signal output by the control unit to the network unit in parallel, the transmission unit of the network unit may be a parallel transmission unit for receiving the determination signal output by the control unit in parallel, and the control unit of the network unit may update the table memory upon detecting the determination signal generated by the control unit of the sensor unit on the basis of a change in a signal of each signal line of the parallel transmission unit.

The table memory may store the determination signal and a time of a change of the determination signal for each of the sensor units.

The table memory may store a pair of a rising time and a fall time of a judgment signal for each of the sensor units.

The table memory may store a pair of a rising time and a fall time of the determination signal and a judgment signal for each of the sensor units.

In order to solve this problem, the continuously-arranged sensor system of the present invention is a continuously-arranged sensor system including: a network unit connected to a host control apparatus; and at least one or more sensor units, wherein the network unit and any one of the sensor units are physically connected with each other, and the sensor units are physically connected with each other, wherein the sensor unit includes: a connection unit for connecting to any one of the adjacent network unit and the adjacent sensor unit; a sensor unit for outputting a detection signal in accordance with a physical quantity detected from an object; a time measuring unit for outputting a current time; a control unit for generating a determination signal upon comparing the detection signal with a predetermined threshold value, and transmitting the determination signal and current time obtained from the time measuring unit; a serial transmission unit for transmitting and receiving a serial signal including the determination signal output by the control unit and the current time, wherein the serial signal is constituted by a signal including a plurality of bits, wherein the network unit includes: a connection unit for connecting to any one of the sensor units that is adjacent to the network unit; a serial transmission unit for transmitting and receiving a serial signal representing the determination signal of the sensor unit and time information, wherein the serial signal is constituted by a signal including a plurality of bits; a table memory for memorizing time information of the determination signal sent from each of the sensor units; and a control unit for receiving the determination signal sent from the coupled sensor unit, and storing, to the table memory, the time information of the change of the determination signal.

In order to solve this problem, the network unit of the present invention is a network unit used in a continuously-arranged sensor system including a network unit connected to a host control apparatus and at least one or more sensor units, wherein the network unit and any one of the sensor units are physically connected with each other, and the sensor units are physically connected with each other, the network unit including a connection unit for connecting to any one of the sensor units that is adjacent to the network unit, a serial transmission unit for transmitting and receiving a serial signal representing the determination signal of the sensor unit, wherein the serial signal is constituted by a signal including a plurality of bits, a table memory for memorizing time information and the determination signal sent from each of the sensor units, and a control unit for receiving the determination signal of the sensor sent from the coupled sensor units, and storing, to the table memory, the determination signal of the sensor and current time information.

In order to solve this problem, the network unit of the present invention is a network unit used in a continuously-arranged sensor system including a network unit connected to a host control apparatus and at least one or more sensor units, wherein the network unit and any one of the sensor units are physically connected with each other, and the sensor units are physically connected with each other, the network unit including a connection unit for connecting to any one of the sensor units that is adjacent to the network unit, a parallel transmission unit for receiving the determination signal transmitted from each of the sensor units via a parallel transmission line in parallel, a time measuring unit for outputting a current time, a table memory for memorizing the determination signal transmitted from each of the sensor units and time information of the time measuring unit, and a control unit for receiving the determination signal of the sensor sent from the coupled sensor units, and storing, to the table memory, the determination signal of the sensor and current time information.

In order to solve this problem, the sensor unit of the present invention is a sensor unit used in a continuously-arranged sensor system including a network unit connected to a host control apparatus and at least one or more sensor units, wherein the network unit and any one of the sensor units are physically connected with each other, and the sensor units are physically connected with each other, the sensor unit including a connection unit for connecting to any one of the adjacent network unit and the adjacent sensor unit, a sensor unit for outputting a detection signal in accordance with a physical quantity detected from an object, a time measuring unit for outputting a current time, a control unit for generating a determination signal upon comparing the detection signal with a predetermined threshold value, and transmitting the determination signal and the current time obtained from the time measuring unit, and a serial transmission unit for transmitting and receiving a serial signal including the determination signal output by the control unit, wherein the serial signal is constituted by a signal including a plurality of bits.

A determination signal referred to in the present invention means a binary signal obtained by comparing a signal generated based on a sensor detection signal with a predetermined threshold value.

In the continuously-arranged sensor system according to the present invention, the determination signal of each sensor unit is transmitted to the network unit side via the serial transmission unit. The time information at which data is updated is simultaneously stored at this moment, so that the time of the determination signal can be obtained. Therefore, the network unit or the host control apparatus can centrally manages operational state of each sensor unit. The network unit can manage the operational state of each sensor unit on the basis of the received information. Further, required data are transmitted to the host control apparatus, and therefore, it is possible to centrally manage the operational state of each sensor unit.

A transparent-type and a reflective-type photoelectric sensor unit can be used as the sensor unit according to the present invention. When a photoelectric sensor is employed, a fiber sensor in which an optical fiber extends from a sensor unit to an object detection area is preferable. When a fiber sensor is used, it is necessary to connect a sensor head to a sensor unit. Accordingly, the fiber sensor requires a large footprint of a light-receiving element and a light-emitting element in the unit and the connection structure of the sensor head. Therefore, one sensor unit is preferably configured to have one sensor head. Further, the sensor unit may be other sensor units such as a proximity sensor, a pressure sensor, and an ultrasonic wave sensor.

In the present invention, a connection unit connecting between adjacent units includes a connection unit physically connecting between the units and a signal connection unit for transmitting a signal. Alternatively, a connection unit for transmitting a signal via an electrical connection and a connection unit for transmitting a signal by transmitting and receiving light may be employed as the signal connection unit for transmitting a signal.

In the continuously-arranged sensor system, a parallel transmission line may be formed with a pair of connectors arranged with the same number of connection terminals in each sensor unit. In this case, the connection terminals on a connector of the upstream side respectively correspond to the connection terminals on a connector of the downstream side. The sensor determination signals is provided to one of the connection terminals arranged on the upstream side. The connection terminals of the downstream side, except for the connection terminal to which the determination signal is connected, are connected to the connection terminals on the upstream side in such a manner that the correspondence is sequentially shifted on the basis of a predetermined rule. The parallel transmission line can be structured as described above.

In the continuously arranged sensor system according to the invention of the present application, the network unit stores the time information of the determination signal obtained via the serial transmission unit. This signal is once stored to the table memory, and can be transmitted to the host control apparatus in response to a request from the host control apparatus. Therefore, the continuously arranged sensor system can be provided that allows the host control apparatus side to centrally manage the operational state of each sensor unit.

According to the invention, the sensor determination signal output by each sensor unit is respectively independently transmitted to the network unit via the parallel transmission line without delay. The network unit can determine a processing situation of an object to be detected by referencing the received determination signal of each sensor.

According to the invention, the current output state of the determination signal of the sensor output from each sensor unit and the time of the change are shown. Therefore, the network unit can store the time of the past at which the received determination signal of each sensor unit changed. Further, this information can be transmitted to the host control apparatus via this network unit.

According to the invention, the information about the rising and fall time of the determination signal of each sensor unit can be obtained. The host control apparatus can use this information to perform processing such as timing control.

According to the invention, the network unit preferably applicable to this continuously-arranged sensor system can be provided.

According to the invention, the sensor unit preferably applicable to this continuously-arranged sensor system can be provided.

BRIEF DESCRIPTION OF THE DRAWINGS

FIG. 4A is an example of a table memory according to the first embodiment of the present invention;

FIG. 4B is another example of the table memory according to the second embodiment of the present invention;

FIG. 4C is a figure showing one example of a table memory according to the third embodiment of the present invention;

FIG. 4D is a figure showing one example of a table memory according to the fourth embodiment of the present invention;

FIG. 12 is a figure showing one example of a table memory according to the fifth embodiment of the present invention;

DETAILED DESCRIPTION OF THE PREFERRED EMBODIMENTS (First Embodiment)

Figure 1:
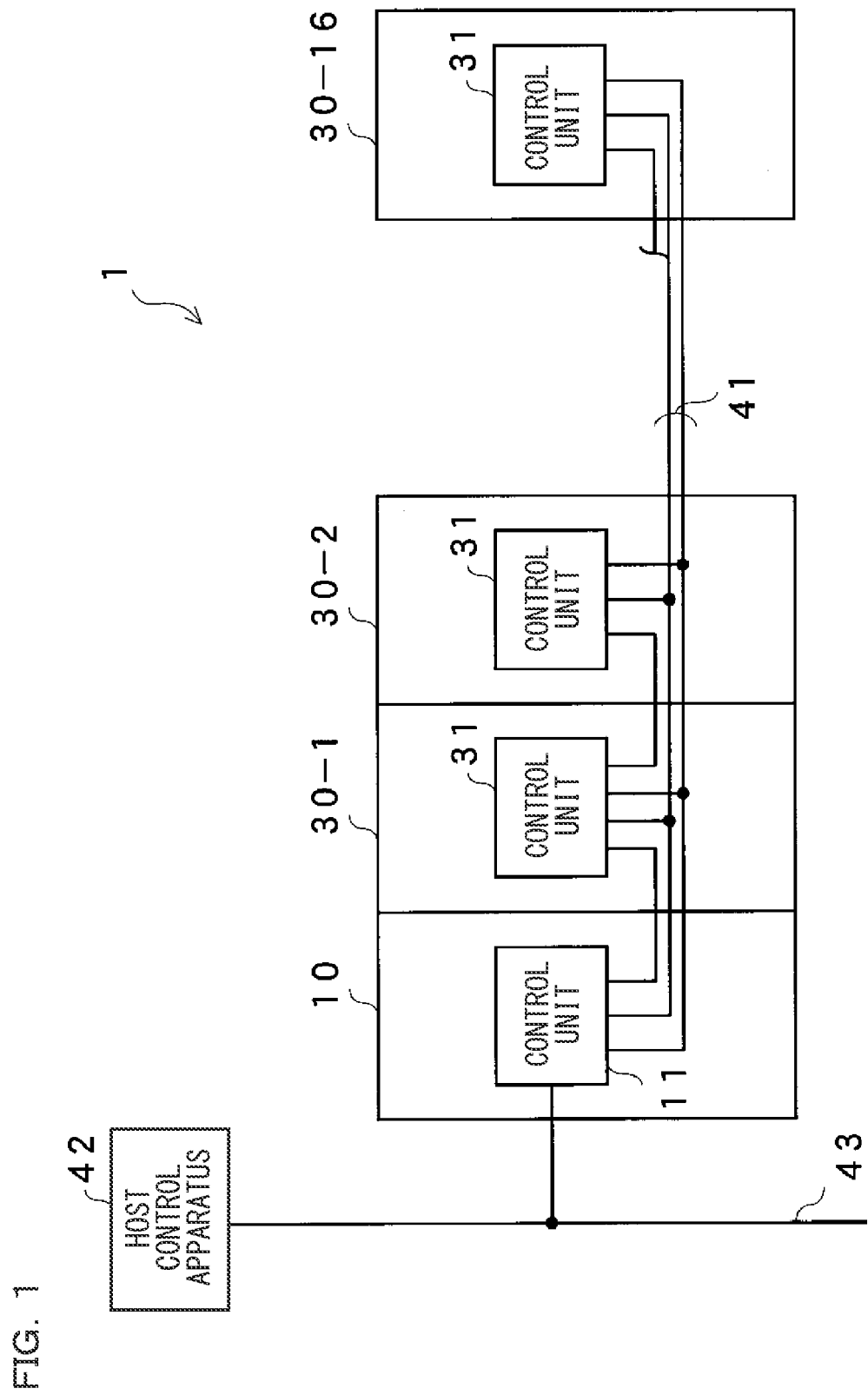
FIG. 1 is a figure showing an entire configuration of a continuously-arranged sensor system according to the first embodiment of the present invention.

FIG. 1 is a figure showing an entire configuration of a continuously-arranged sensor system according to the first embodiment of the present invention. The continuously-arranged sensor system 1 includes at least one sensor unit connected to a network unit 10. In this embodiment, a series of sixteen sensor units 30-1 to 30-16 are connected to the network unit 10. These units are electrically connected via a serial transmission line 41 including at least two serial transmission lines. Hereinafter, a direction toward the network unit 10 is referred to as upstream direction, and a direction toward the sensor unit 30-16 is referred to as downstream direction. The network unit 10 is adapted to collect signals transmitted from the sensor units 30-1 to 30-16 and to transmit a necessary signal to a host control apparatus 42, and is connected to the host control apparatus 42 via a feed bus 43.

Figure 2:
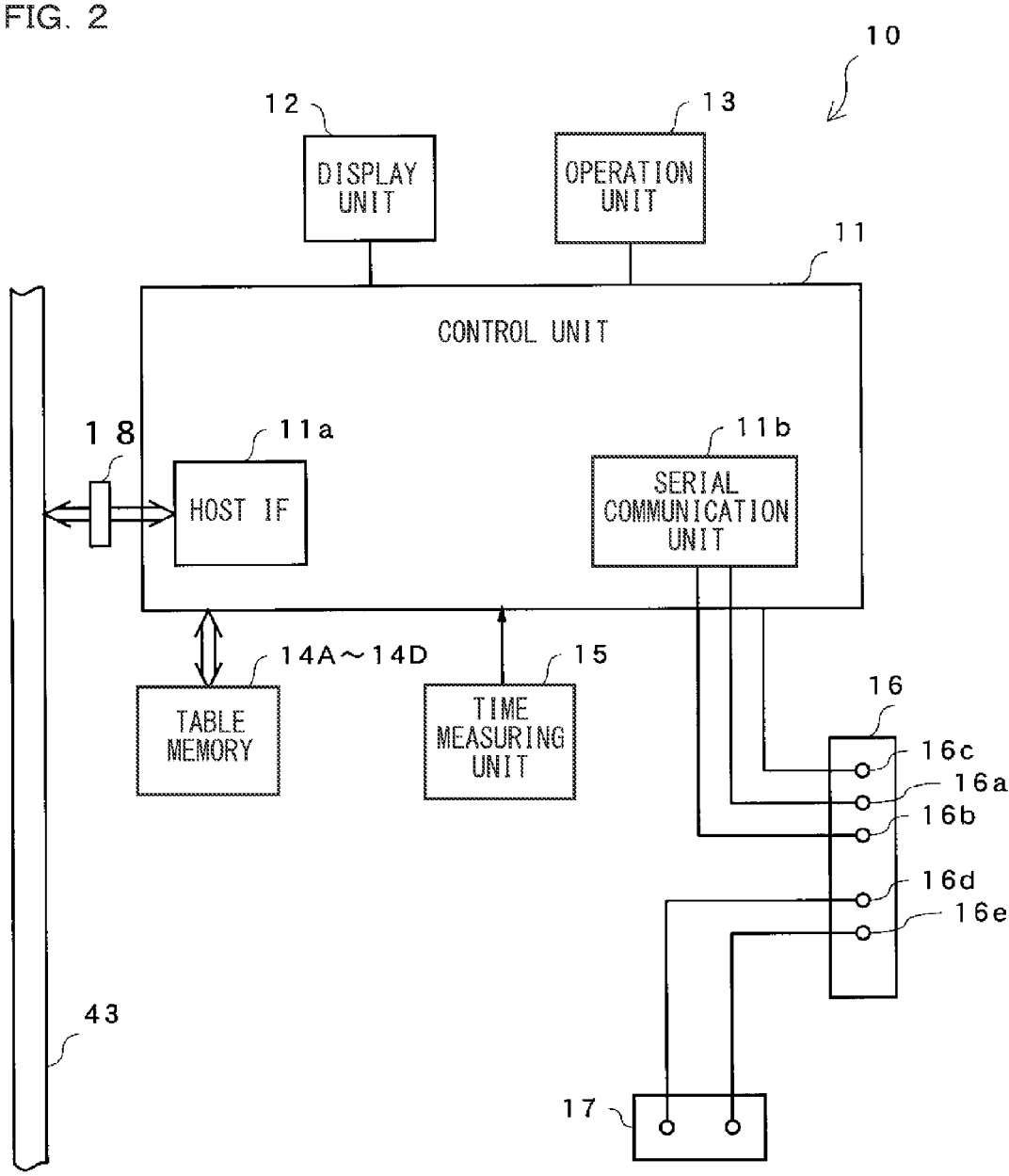
FIG. 2 is a block diagram showing a network unit according to the first embodiment.
Figure 3A:
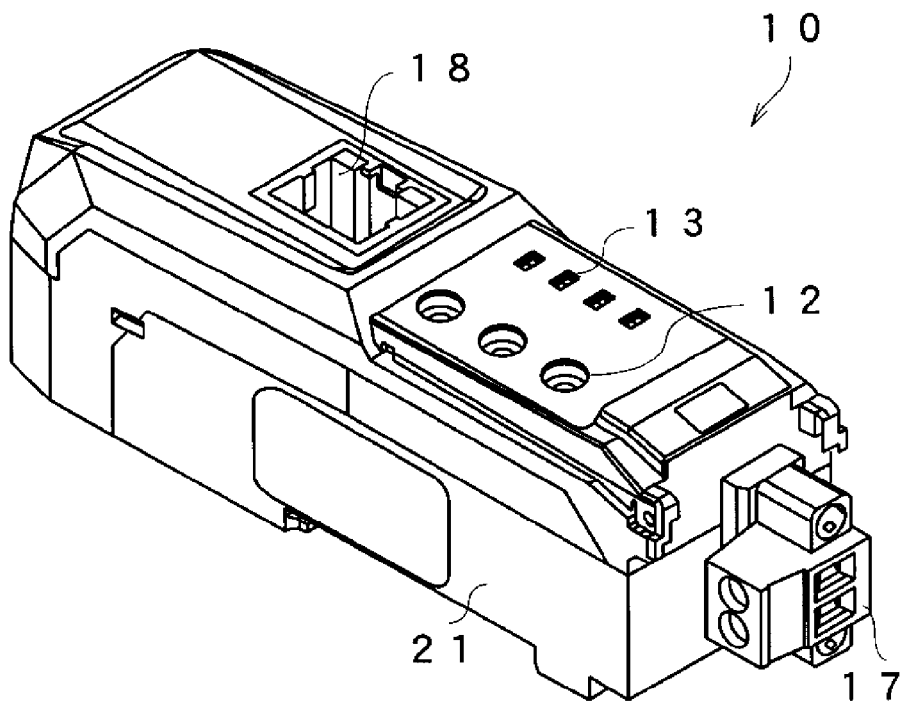
FIG. 3A is a perspective view showing the network unit according to the first embodiment seen from one side.
Figure 3B:
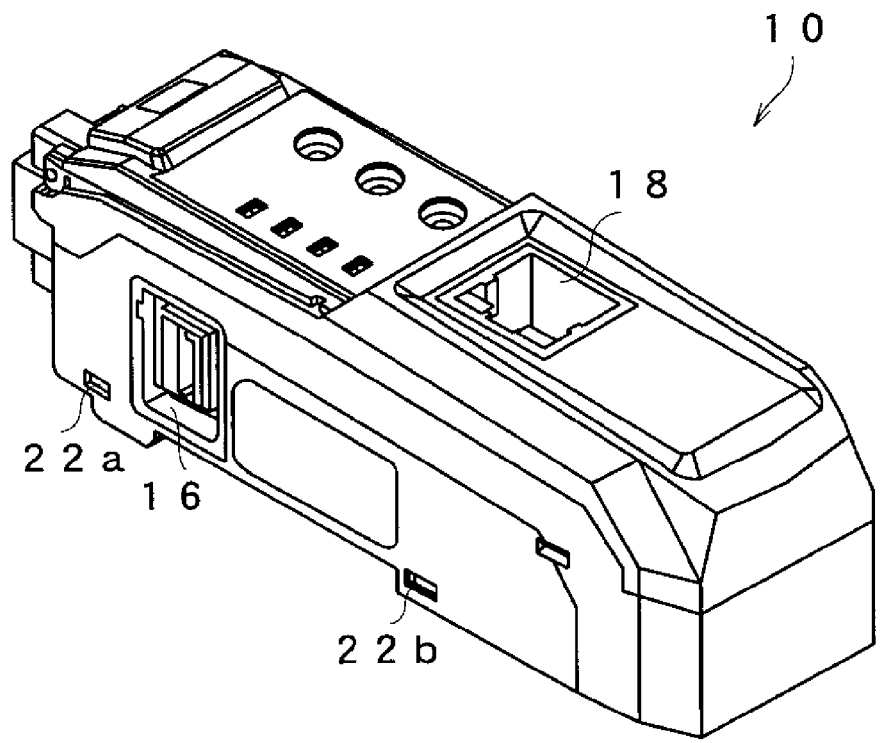
FIG. 3B is a perspective view showing the network unit of FIG. 3A seen from the other side.

Subsequently, each unit will be described in detail. FIG. 2 is a block diagram showing an internal configuration of the network unit 10. FIG. 3A and FIG. 3B are perspective views showing the network unit 10. FIG. 3A and FIG. 3B depict the network unit 10 from different angles.

As shown in FIG. 2, the network unit 10 includes a control unit 11. The control unit 11 includes a host interface (IF) 11a and a serial communication unit 11b. The control unit 11 of the network unit 10 is connected to a display unit 12, an operation unit 13, a table memory 14A, a time measuring unit 15, and connectors 16, 17 and 18.

The control unit 11 is adapted to transmit and receive a serial signal to and from the sensor unit via the serial transmission line 41.

The host interface 11a receives a command from the host control apparatus 42 via the connector 18, and transfers stored data to the host control apparatus 42.

The serial communication unit 11b is connected to the serial transmission line 41 of the connector 16, and performs serial communication with each sensor unit connected to the continuously-arranged sensor system. The serial communication unit 11b constitutes a serial transmission unit.

The table memory 14A stores a table including determination signals (ON/OFF signals) and time information of many sensor units connected to the network unit 10. As shown in FIG. 4A, the table memory 14A has an area for storing: an update time at which a current determination signal of each sensor unit is requested; and a determination signal obtained from each sensor unit at this time. Herein, the sensor units 30-1 to 30-16 are shown as #1 to #16.

The time measuring unit 15 provides, to the control unit 11, time information such as a time at which data to be stored to the table memory 14A is collected.

The connector 16 has five connection terminals, of which connection terminals 16a and 16b are terminals connected to the serial transmission line 41. A terminal 16c is a connection terminal for a timing signal line. Connection terminals 16d and 16e are terminals for power supply, and are connected to the connector 17 for power supply.

The connector 16 of the network unit 10 constitutes a connection unit for electrically connecting to the sensor unit 30-1. The connector 16 transmits and receives the serial signal via the serial transmission line 41, and is adapted to not only transmit a timing signal but also provide electric power to each sensor unit.

The network unit 10 is a unit containing members in a case 21 in a rectangular parallelepiped shape as shown in FIG. 3A and FIG. 3B. The network unit 10 is used by connecting one sensor unit to one sidewall thereof.

As shown in FIG. 3A, the connector 18 is arranged on a top surface of the case 21. The connector 18 is adapted to connect to the host control apparatus 42 such as a programmable controller and a computer. One longitudinal end of the case 21 is arranged with the connector 17 constituted by a screw-type terminal, to which a power supply line, not shown, is connected. An upper surface of the case 21 is arranged with the display unit 12 and operation switches of the operation unit 13.

As shown in FIG. 3B, one sidewall of the case 21 is arranged with the above-described connector 16. The connector 16 has five connection terminals, of which two connection terminals connect to the serial transmission line 41 on downstream side. The remaining connection terminals are used for timing and power supply.

One sidewall of the case 21 is arranged with engaging concave sections 22a and 22b in proximity to both longitudinal ends. Engaging protrusions arranged on the later-described sensor unit 30-1 are inserted into these engaging concave sections 22a and 22b so that the engaging concave sections 22a and 22b engage therewith. The engaging concave sections 22a and 22b constitute a connection unit for positioning and physical connection when the units are coupled with each other.

Figure 5:
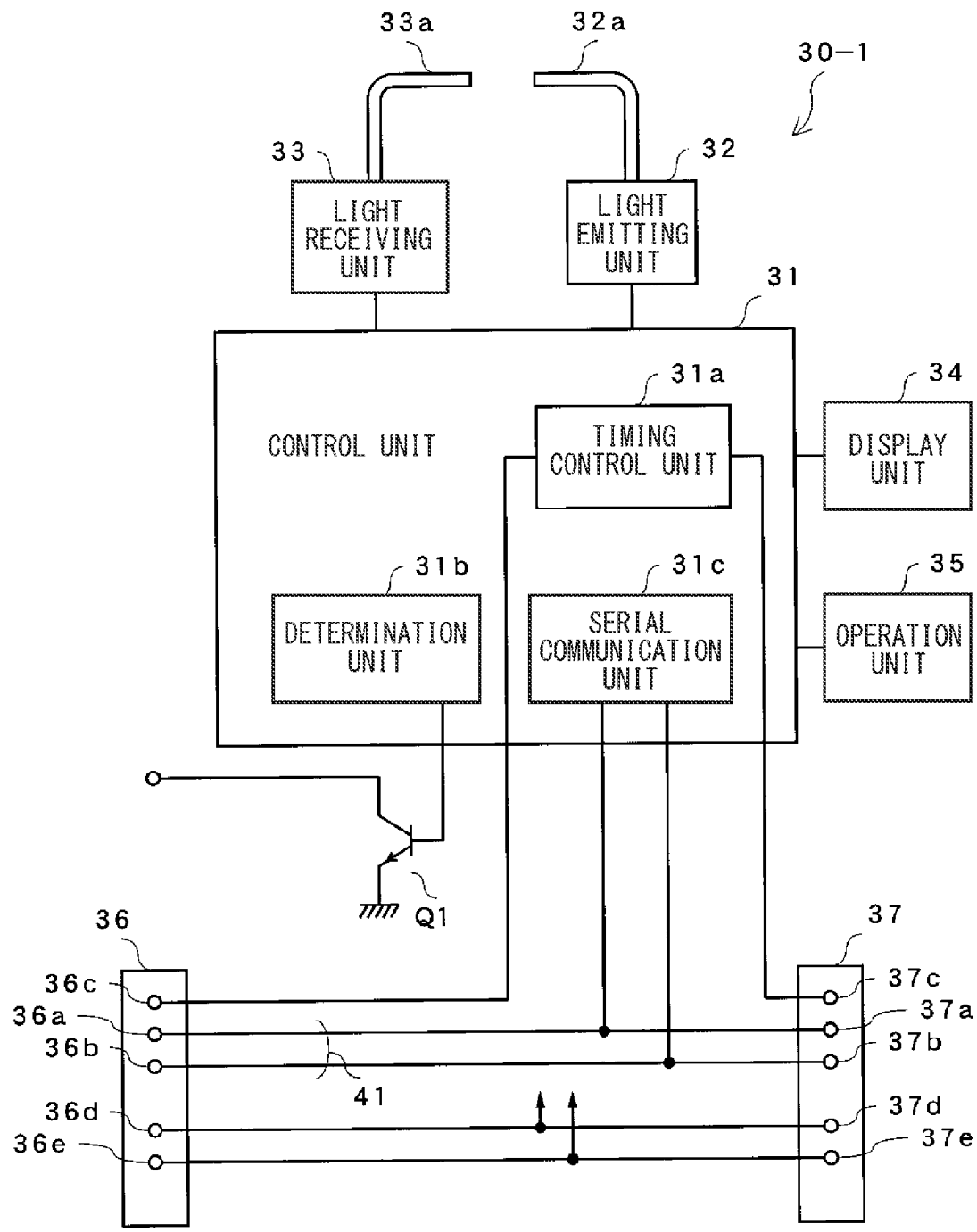
FIG. 5 is a block diagram showing a sensor unit according to the first embodiment.
Figure 6A:
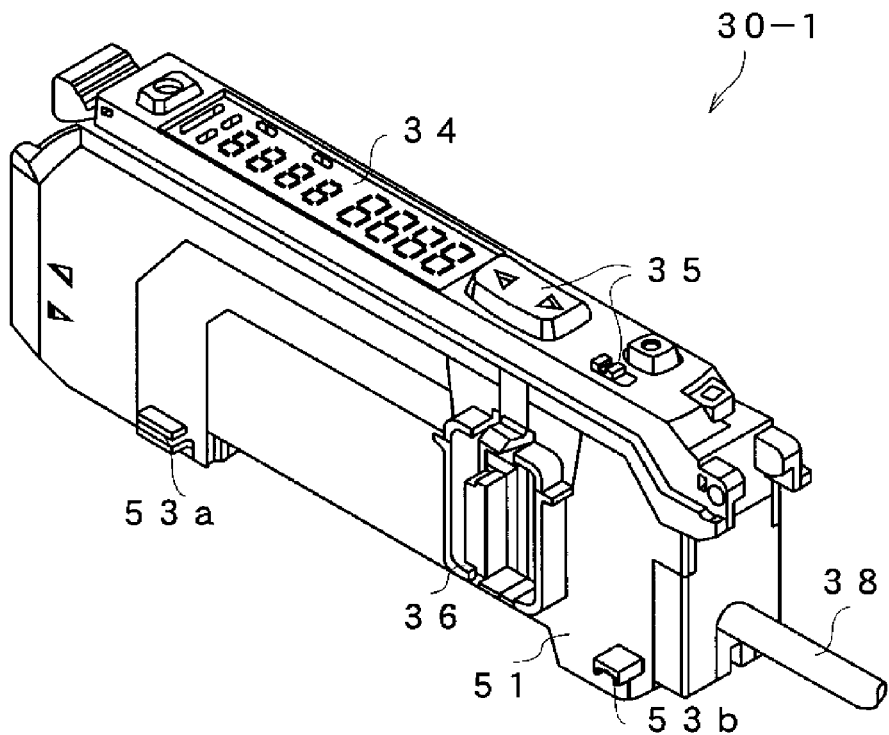
FIG. 6A is a perspective view showing the sensor unit according to the first embodiment of the present invention, seen from one side.
Figure 6B:
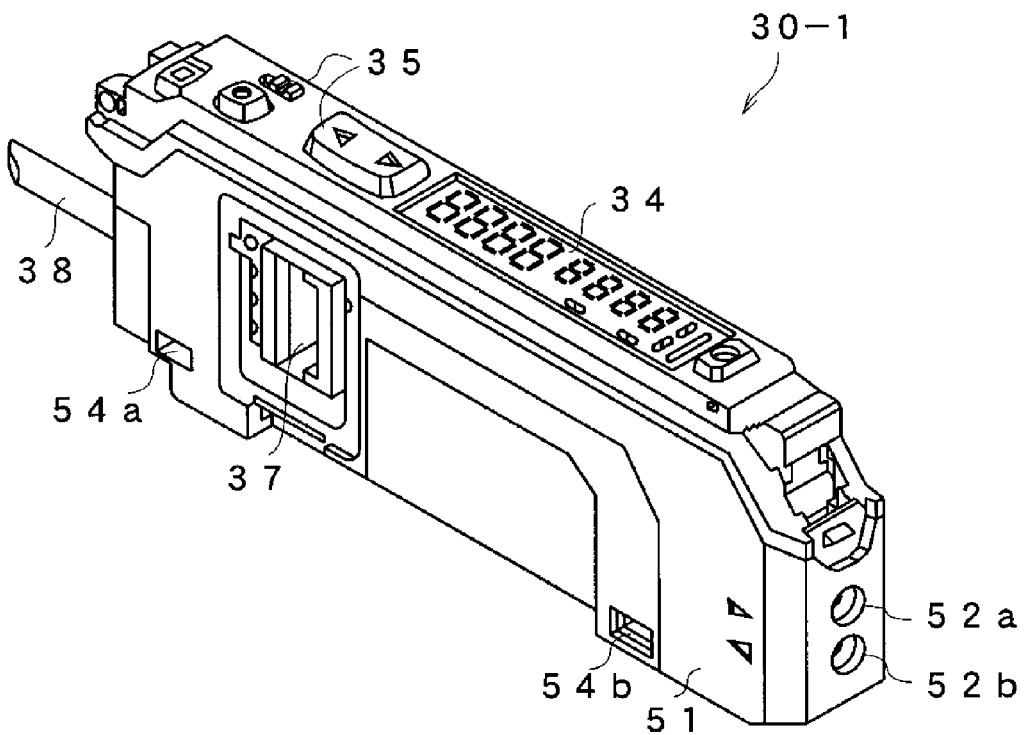
FIG. 6B is a perspective view showing the sensor unit of FIG. 6A, seen from the other side.

Subsequently, the sensor units are explained. In the present embodiment, the sixteen sensor units 30-1 to 30-16 are coupled, but each sensor unit has the same configuration. Therefore, only the sensor unit 30-1 will be explained with reference to drawings. FIG. 5 is a block diagram illustrating an internal configuration of the sensor unit 30-1. FIG. 6A is a perspective view showing the sensor unit 30-1 seen from one side. FIG. 6B is a perspective view showing the sensor unit 30-1 seen from the other side. In the sensor unit 30-1 according to the present embodiment, the photoelectric sensor has a head sensor made of a pair of optical fibers for emitting light and receiving light. A detection signal is generated in accordance with the amount of light received from the optical fiber for receiving light, and a determination signal is generated by making this detection signal into a binary value using a predetermined threshold value. This determination signal is output.

As shown in FIG. 5, the sensor unit 30-1 has a control unit 31 made with one chip gate array G and a microprocessor. A timing control unit 31a, a determination unit 31b, and a serial communication unit 31c are arranged in the control unit 31. The control unit 31 is connected to a light emitting unit 32, a light receiving unit 33, a display unit 34, an operation unit 35, an output transistor Q1, and connectors 36 and 37.

The timing control unit 31a gives a timing signal to the light emitting unit 32 when the timing signal is transmitted to a terminal 36c. Further, after a predetermined time, for example about 10 micro seconds, passes, the timing control unit 31a outputs a timing signal to a connection terminal 37c.

The determination unit 31b distinguishes the amount of received light on the basis of a predetermined threshold value so as to convert the amount of received light into a determination signal having an ON/OFF binary value. The determination signal of the sensor is directly output to the outside via an output transistor Q1 and an output line 38.

The serial communication unit 31c is connected to the serial transmission line 41 of the connectors 36 and 37, and performs serial communication with the network unit 10 connected to the continuously-arranged sensor system. Therefore, the serial communication unit 31c constitutes a serial transmission unit.

The light emitting unit 32 drives a light emitting device on the basis of the timing signal transmitted from the timing control unit 31a. The light emitted by the light emitting device is transmitted via an optical fiber 32a, and the light is emitted from the tip of the optical fiber 32a. The light emitted by the optical fiber 32a enters into an optical fiber 33a via an object detection area, and is directed to the light receiving unit 33. The light receiving unit 33 converts the incident light into an electric signal, and amplifies the electric signal.

Herein, the light emitting unit 32, the light receiving unit 33, and the optical fibers 32a and 33a constitute a sensor unit for outputting the detection signal in accordance with physical quantities detected from the object.

The connector 36 is formed with a connector having the same shape as the connector 16 of the network unit 10 and the connector 37 of the adjacent sensor unit, and these connectors can be connected with each other. Further, the connector 36 has two connection terminals 36a and 36b connected to the upstream side of the serial transmission line 41, a connection terminal 36c for the timing signal, and connection terminals 36d and 36e for power supply.

The connector 37 has two connection terminals 37a and 37b connected to the downstream side of the serial transmission line 41. The connection terminals 36a and 36b of the connector 36 are directly connected to the connection terminals 37a and 37b of the connector 37, respectively, thus constituting the serial transmission line 41.

The connection terminal 36c of the connector 36 is connected to the connection terminal 37c of the connector 37 via the timing control unit 31a. The connection terminals 36d and 36e of the connector 36 are directly connected to the connection terminals 37d and 37e of the connector 37, respectively, so as to provide electric power to the sensor unit 30-1 and the sensor units of downstream.

As shown in FIG. 6A and FIG. 6B, the sensor unit 30-1 is a unit containing members in a narrow case 51. An upper surface of the case 51 is arranged with a display unit 34 made with a four-digit seven-segment LED display device and an operation unit 35 made with various switches. The display unit 34 can digitally display the amount of received light and setting thresholds of the sensor and values such as the amount of received light, and margins.

The upper section of the case 51 is arranged with a cover for detachably covering the entire upper surface, but this cover is omitted from FIG. 6. The longitudinal end of the case 51 is arranged with head attachment holes 52a and 52b for attaching the optical fibers 32a and 33a and a fixing lever for fixing the optical fibers 32a and 33a.

As shown in FIG. 6A, one sidewall of the case 51 is arranged with the connector 36. The one sidewall of the case 51 is arranged with engaging protrusions 53a and 53b in proximity to both longitudinal ends. These engaging protrusions 53a and 53b are inserted into the engaging concave sections 22a and 22b of the network 10 to engage therewith. The engaging protrusions 53a and 53b constitute a connection unit for positioning and physically connection when the network unit is coupled. The connector 36 constitutes a connection unit for electrically connecting to a network unit 10 of upstream side or a sensor unit.

As shown in FIG. 6B, the other sidewall of the case 51 is arranged with the connector 37 at a position corresponding to the connector 36. The other sidewall of the case 51 is arranged with engaging concave sections 54a and 54b in proximity to both longitudinal ends. The engaging protrusions arranged on a sensor unit of downstream side are inserted into the engaging concave sections 54a and 54b to engage therewith. The engaging concave sections 54a and 54b constitute a connection unit for positioning and physical connection when the sensor units are coupled with each other. The connector 37 constitutes a connection unit for electrically connecting to a sensor unit of upstream side.

The sensor unit 30-1 according to the present embodiment can not only perform detection operation but also configure and switch an operational state with switch operations performed on the operation unit 35. For example, an operational mode of the sensor unit 30-1 and display data for the display unit 34 can be configured and switched. It is possible to switch which of input or non-input of light to the light receiving unit 33 causes an ON signal to output. It is possible to change the display data on the display unit 34 and switch the operational mode, on the basis of a command transmitted via the serial transmission line 41.

Figure 7:
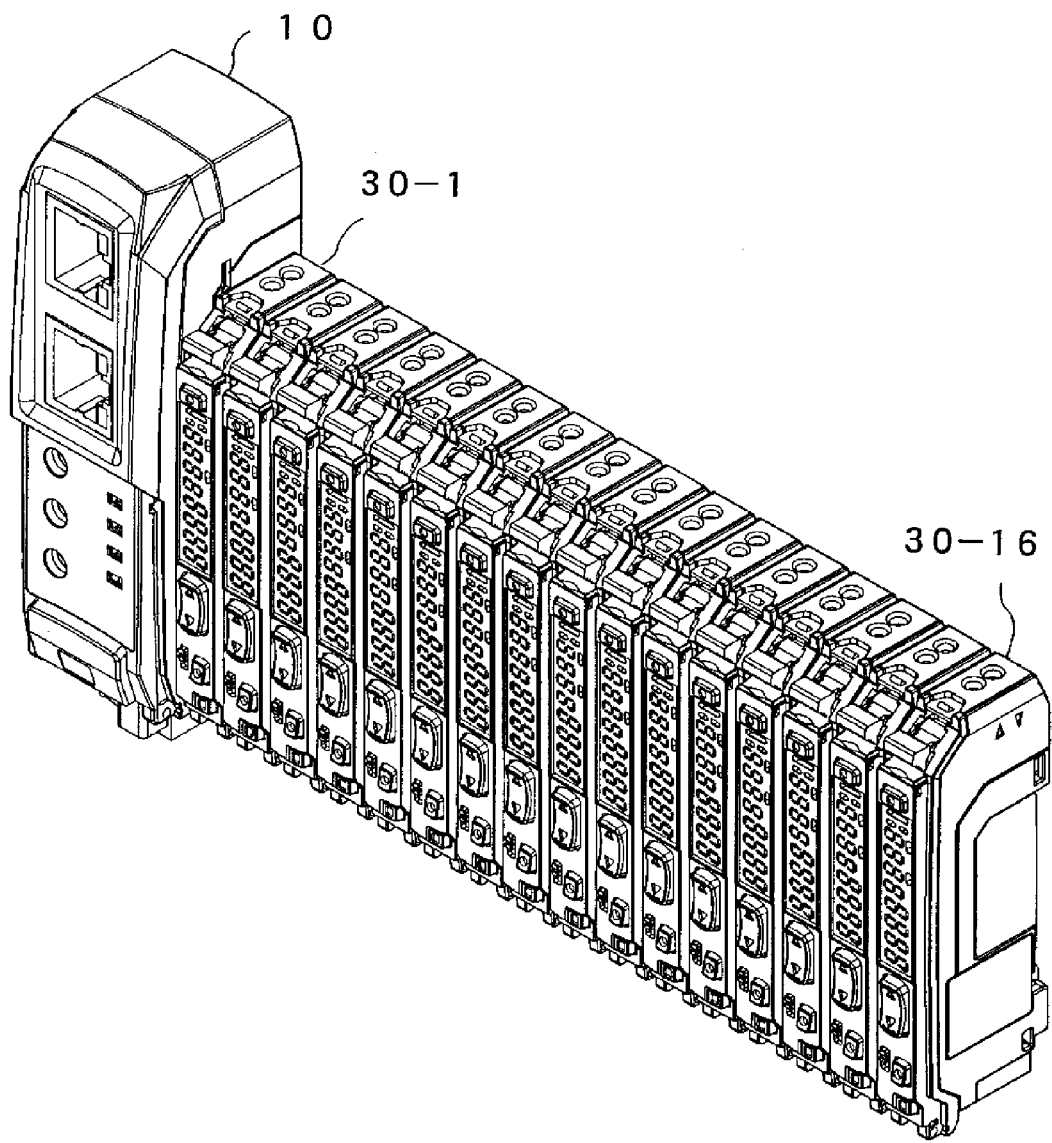
FIG. 7 is a perspective view showing the entire configuration of the continuously-arranged sensor system according to each of the embodiments of the present invention.

Subsequently, a configuration of a continuously-arranged sensor system 1 and its operation will be described. The continuously-arranged sensor system 1 is made as a combination of the network unit and the sensor units. The continuously-arranged sensor system 1 according to the present embodiment can be made into various forms by combining the network unit 10 and at least one sensor unit. But, in the present embodiment, it is assumed that one network unit 10 and sixteen sensor units 30-1 (#1) to 30-16 (#16) are coupled and connected with each other as shown in FIG. 1 and FIG. 7. When the network unit 10 and the sensor unit 30-1 are coupled, the connectors 16 and 36 are connected with each other. Further, the connector 37 of each sensor unit is connected to the connector 36 of an adjacent sensor unit.

In the continuously-arranged sensor system 1 according to the present embodiment, the connector 18 of the network unit 10 is connected to the host control apparatus 43 via a cable, and the connector 17 is connected to a direct current power supply. In each sensor unit, an optical fiber, not shown, is extended to a monitoring position of a workpiece. The network unit 10 as shown in FIG. 7 is arranged with two connectors 18 to show an example of a communication system in which the connection to the host control apparatus 43 is assumed to be daisy chain connection. Accordingly, one of the connectors 18 is connected to another network unit 10 of upstream side or the host control apparatus 43, and the other of the connectors 18 is connected to another network unit of downstream side or is not connected to anything. It is to be understood that the present invention is not limited to daisy chain connection, and can be applied to other communication systems such as multi-drop connection as shown in FIG. 2 and FIG. 3.

In the continuously-arranged sensor system 1 having the above-described configuration, a unique address is set to each sensor unit during transmission of the serial signal. The address may be set using a DIP switch arranged on each sensor unit, or the address may be automatically set upon recognizing a connection state of each sensor unit.

In the continuously-arranged sensor system 1, the monitoring of workpieces is controlled as follows. When the control unit 11 of the network unit 10 transmits a timing signal to the adjacent sensor unit 30-1, the timing control unit 31a of the sensor unit 30-1 receives the timing signal.

When the timing control unit 31a of the sensor unit 30-1 receives the timing signal, the control unit 31 causes the light emitting unit 32 to emit light, so that the light receiving unit 33 obtains a light reception signal of a different level according to whether there is a workpiece or not. The light reception signal is converted into a binary determination signal using a threshold value set by the determination unit 31b, and the sensor unit 30-1 outputs the determination signal to the outside via the output transistor Q1 and the output line 38. This determination signal and the amount of received light are stored until a subsequent timing signal is obtained.

After a predetermined time (for example, 10 micro seconds) passes since the timing signal is received, the timing control unit 31a transmits the timing signal to the adjacent sensor unit from the terminal 37c. As described above, the timing signal delayed by each sensor unit by a predetermined time is relayed to each sensor unit of downstream side in a bucket brigade manner. Accordingly, a time of light emission is delayed by the predetermined time in each sensor unit, so that a sensor unit of downstream side has a larger delay time of light emission than a sensor unit of upstream side. Therefore, an interference between photoelectric sensors can be prevented.

The network unit 10 attaches a common ID code to the sensor units, and transmits a data transmission command to all of the sensor units via the serial transmission line 41. When this command is transmitted, time information provided by the time measuring unit 15 is stored as an update time to the table memory 14A. Therefore, a response can be obtained from each sensor unit via the serial transmission line 41. Each of the response is received at a different time, but the obtained data themselves are in synchronization. In other words, the determination signal of a same time can be obtained from all of the sensor units. The network unit 10 stores the determination signal to the table memory 14A. FIG. 4A shows a memory map of the table memory 14A thus obtained. The table memory 14A stores the update time at which data are updated and the determination signal obtained from each sensor unit.

When the responses are obtained from the sensor units, the network unit 10 transmits a data transmission command again to perform the same processings. In this way, data transmission commands are transmitted in a cycle, so that the latest output state can always be stored in the table memory 14A. The data transmission commands are preferably output in a short cycle, but the cycle should be equal to or more than a time taken to obtain data of the determination signals from all of the sensor units via the serial transmission line 41.

In response to an inquiry from the host control apparatus 42, the network unit 10 reads the determination signals and the update times of the sensor units from the table memory 14A, and transmits the determination signals and the update times to the host control apparatus 42 via the host IF 11a and the connector 18. The host control apparatus 42 can perform necessary processings using the information about the determination signals and the update times.

Figure 8:
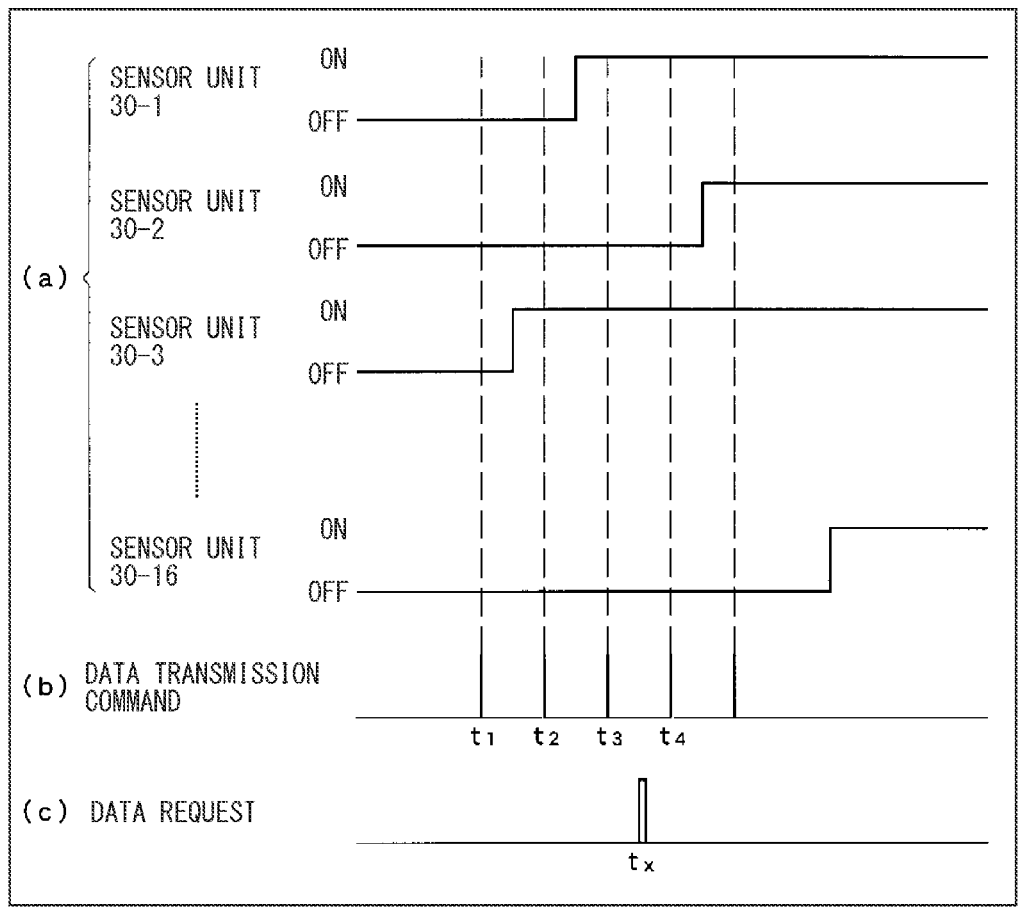
FIG. 8 is a timing chart showing output changes of the sensor units, timing of a data transmission command, and timing of a transmission request given by a host control apparatus according to the first embodiment of the present invention.

For example, FIG. 8A shows variation of the determination signals of the sensor units 30-1 to 30-16, and each sensor unit turns on or off at a different time. The network unit 10 transmits the data transmission command at periodical times, t1, t2, ... as shown in FIG. 8B, so that the states of the sensor units occurred at times indicated by broken lines are stored to the table memory 14A. Therefore, when the host control apparatus 42 requests to the network unit 10 for data occurred at a time tX as shown in FIG. 8C, the contents of the table memory 14A representing the state occurred at that time can be transmitted to the host control apparatus 42. In other words, as shown in FIG. 8B, the host control apparatus 42 can obtain the determination signals of the sensor units occurred at a latest update time t3 at which the network unit 10 transmitted the data transmission command.

(Second Embodiment)

Subsequently, a continuously-arranged sensor system according to the second embodiment of the present invention will be described. The configurations of the present embodiment are the same as those of the first embodiment except for the data contents stored in the table memory 14B. In the present embodiment, the network unit 10 does not transmit the data transmission command to each sensor unit. When the determination signal changes, the determination unit 31b of each sensor unit transmits an ON determination signal or an OFF determination signal to the network unit 10 via the serial transmission line 41. The control unit 11 of the network unit 10 receives the change of the determination signal from any one of the sensor units, the control unit 11 simultaneously writes, to the table memory 14B, either ON state or OFF state and the time obtained from the time measuring unit 15 indicating a time at that moment as a change time. Therefore, the table memory 14B can be generated as shown in FIG. 4B. In this case, the current output state and the change time are shown, which enables storing the change times of the past as they are.

In response to an inquiry from the host control apparatus 42, the network unit 10 further reads the update time and the determination signal of each sensor unit from the table memory 14B, and transmits the update time and the determination signal to the host control apparatus 42 via the host IF 11a and the connector 18. The host control apparatus 42 can perform necessary processings using the information about the determination signals and the update times.

Figure 9:
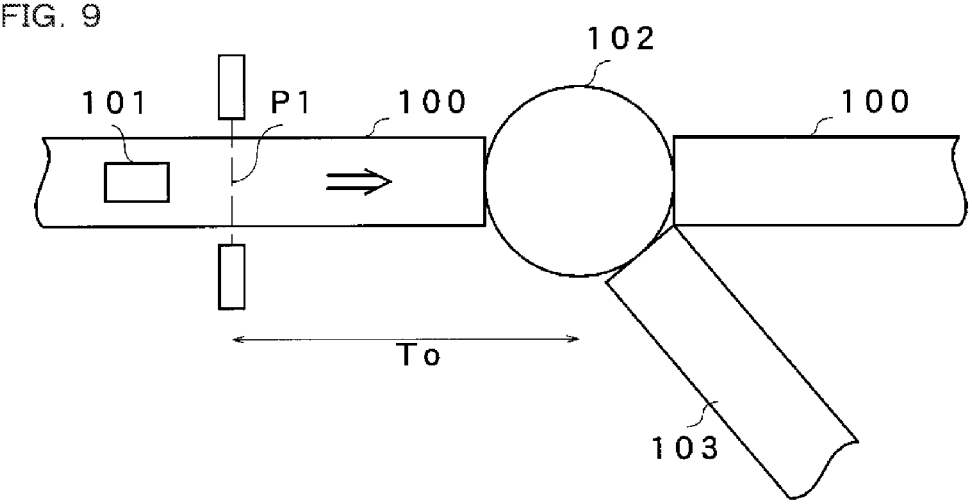
FIG. 9 is an example of a use of the continuously-arranged sensor system according to the first embodiment of the present invention.

In the present embodiment, a timing can be adjusted when the host control apparatus 42 performs a certain processing in a predetermined time after an output of a sensor unit changes. For example, as shown in FIG. 9, a case will be explained where a workpiece 101 being carried along a conveyance line 100 to the right direction of the figure is branched off at a table 102 in To seconds after the workpiece 101 passes a detection point P1. The workpiece 101 can be carried from the conveyance line 100 to the conveyance line 103 by detecting the workpiece 101 passing the detection point P1 in real time and rotating the table 102 in To seconds after the workpiece passes the detection point P1. However, since the host control apparatus 42 recognizes and receives the information in the table memory 14B from the network unit 10, this recognition occurs at a time delayed by a difference ($\Delta$=tX·tc) between the current time (tX) and the change time (tc). Therefore, the host control apparatus 42 can rotate the table 102 at an accurate time by assuming an interval of To·$\Delta$t between the current time (tX) and the time at which the table 102 is rotated.

(Third Embodiment)

Subsequently, a continuously-arranged sensor system according to the third embodiment of the present invention will be described. The configurations of the present embodiment are the same as those of the second embodiment except for the data contents stored in the table memory 14C. In the present embodiment, when the determination signal changes, the determination unit 31b of each sensor unit transmits an ON determination signal or an OFF determination signal to the network unit 10 via the serial transmission line 41. The control unit 11 of the network unit 10 updates the table memory 14C when the control unit receives the change of the determination signal of the sensor unit. More specifically, as shown in FIG. 4C, a rising time at which the output of each sensor unit is turned on and a fall time at which the output thereof is turned off are stored. When a further change of the output state is transmitted via the serial transmission line 41, the rising time and the fall time in the table memory 14C are rewritten. Therefore, it is possible to recognize the latest two output changes of the sensor unit, i.e., the rising time and the fall time, and recognize that the current output state of the sensor unit is a state indicating a time closer to the current time. Accordingly, in response to an inquiry from the host control unit 42, it is possible to transmit the current output state and the accurate times at which the latest two outputs changed.

In the present embodiment, the timing control shown in FIG. 9 can be carried out in the same manner as the second embodiment. When the conveyance speed of the conveyance line 100 is already known but the length of the workpiece 101 is unknown, the length of the workpiece 101 can be calculated on the basis of the difference between the rising time and the fall time. Alternatively, when the length of the workpiece 101 is already known, the conveyance speed of the conveyance line 100 can be calculated on the basis of the difference between the rising time and the falling time.

(Fourth Embodiment)

Subsequently, a continuously-arranged sensor system according to the fourth embodiment of the present invention will be described. This embodiment is a combination of the above-described second and third embodiments. The configurations and effects of the present embodiment are the same as those of the second and third embodiments except for the data contents stored in the table memory 14D. In the fourth embodiment, the table memory 14D simultaneously stores the output result of each sensor, the rising time, and the falling time as shown in FIG. 4D. In this case, it is possible to distinguish the output result of the sensors, the rising time, and the falling time, and therefore, necessary information can be immediately provided in response to an inquiry from the host control apparatus 42.

(Fifth Embodiment)

Figure 10:
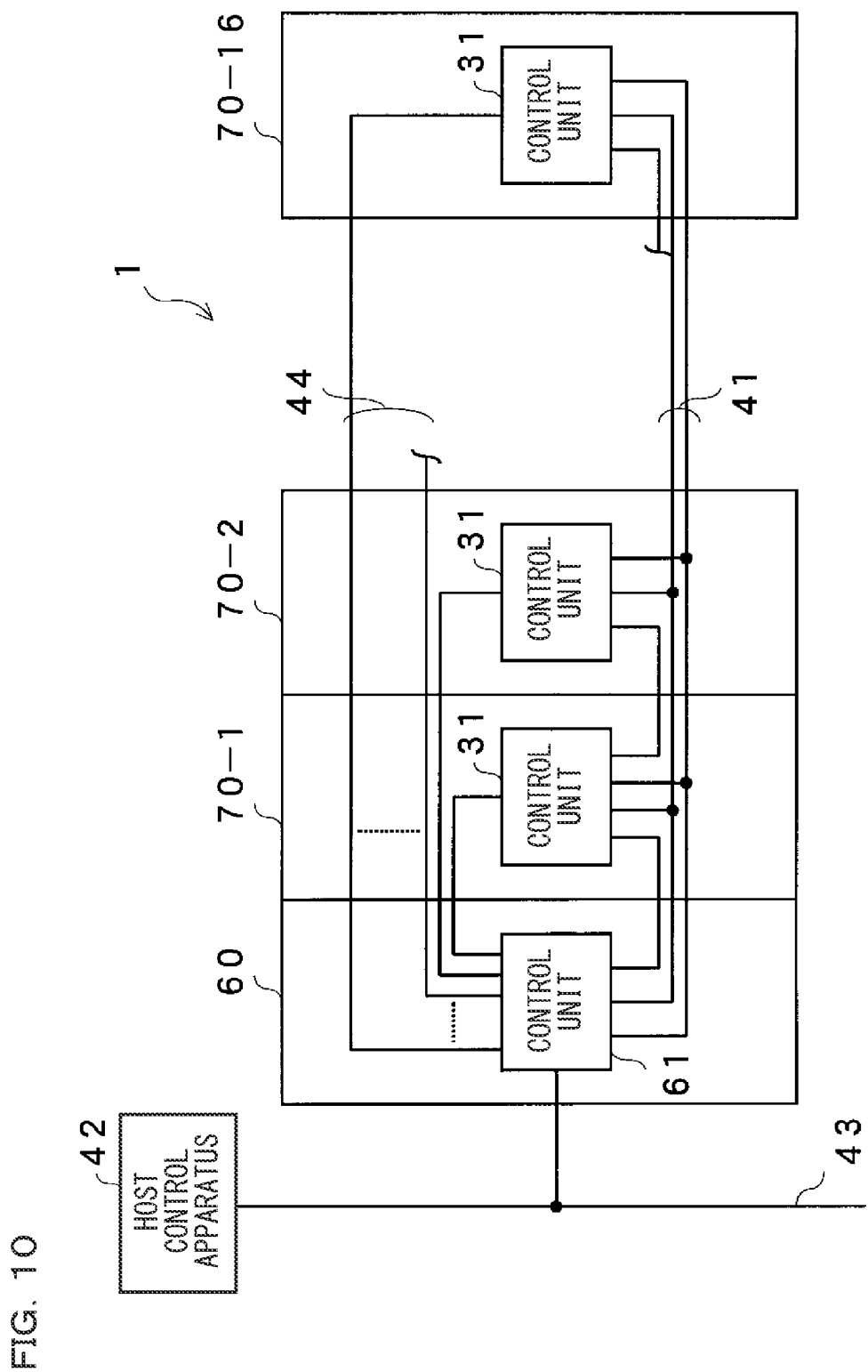
FIG. 10 is a configuration diagram showing the entire continuously-arranged sensor system according to the fifth embodiment of the present invention.

Subsequently, a continuously-arranged sensor system according to the fifth embodiment of the present invention will be described. The same sections as those of the above-described first embodiment are denoted with the same reference numerals, and the detailed description thereabout is omitted. As shown in FIG. 10, the continuously-arranged sensor system according to this embodiment includes has a network unit 60 and a series of at least one sensor unit connected to the network unit 60. In this embodiment, a series of sixteen sensor units 70-1 to 70-16 are connected to the network unit 60. In this embodiment, not only the serial transmission line 41 but also the parallel transmission line 44 are arranged between the network unit 60 and the sensor units 70-1 to 70-16. In this configuration, the parallel transmission line 44 can be used to transmit the determination signal to the network unit 60 in real time. The parallel transmission line 44 is connected to each sensor unit via one signal line, and includes at least sixteen lines.

Figure 11:
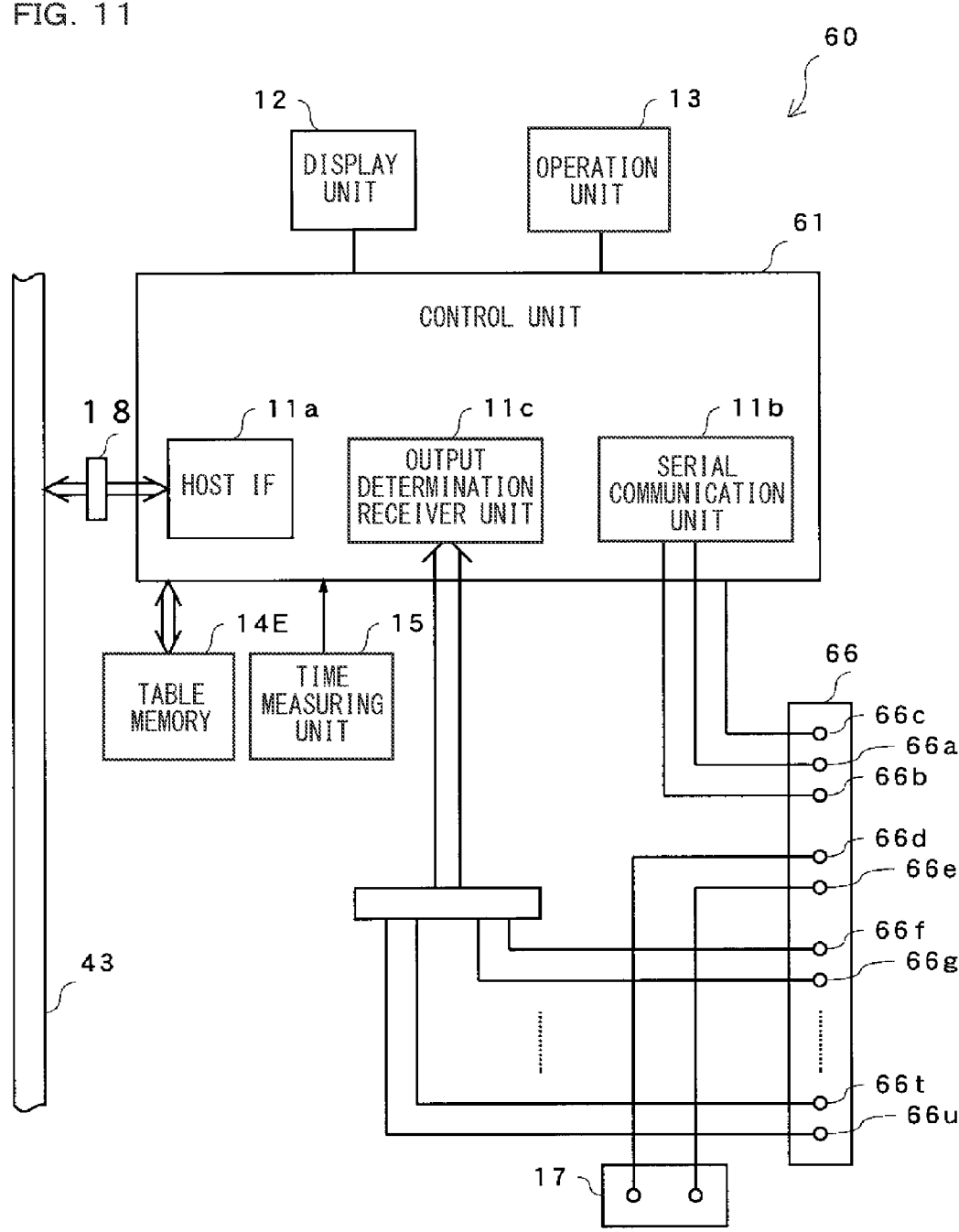
FIG. 11 is a block configuration diagram showing a configuration of a network unit in a continuously-arranged sensor system according to the fifth embodiment of the present invention.

Subsequently, the network unit 60 according to the present embodiment will be described with reference to FIG. 11. A control unit 61 has not only the functions of the control unit 11 according to first embodiment but also a function of receiving a signal transmitted via the parallel transmission line 44, storing the signal by updating a table memory 14E, and outputting the signal to the host control apparatus 42 in response to a request. The output determination receiver unit 11c of the control unit 61 is adapted to receive the determination signal of each sensor unit obtained via the parallel transmission line 44 and store the determination signal to the table memory 14E. The table memory 14E has not only a first area storing the same recorded contents as those stored in the table memory 14A according to the first embodiment but also a second area 14-2. FIG. 12 shows an example of the table memory 14E. The connector 66 has connection terminals 66a to 66e having the same functions as the above-described connection terminals 16a to 16e of the connector 16 according to the first embodiment but also sixteen connection terminals 66f to 66u connected to the downstream side of the parallel transmission line 44.

Figure 13:
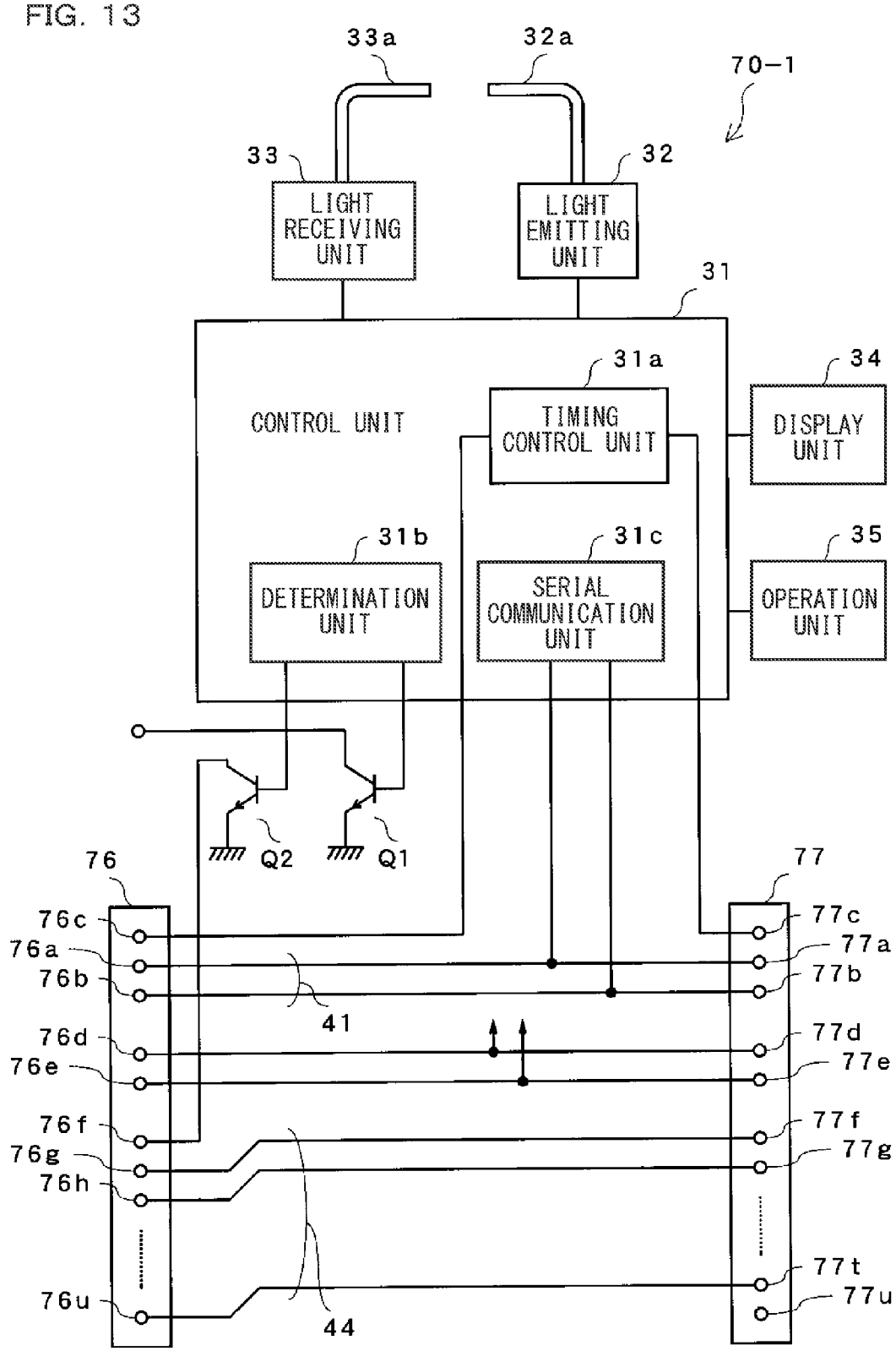
FIG. 13 is a block configuration diagram showing a configuration of a sensor unit in the continuously-arranged sensor system according to the fifth embodiment of the present invention.

Also in this embodiment, the network unit 60 is connected to the sixteen sensor units 70-1 to 70-16. Since each sensor unit has the same configuration, only the sensor unit 70-1 will be explained with reference to the drawings. FIG. 13 shows the sensor unit 70-1. A connector 76 has not only connection terminals 76a to 76e having the same function as the above-described connection terminals 36a to 36e of the connector 36 according to the first embodiment but also sixteen connection terminals 76f to 76u connected to the upstream side of the parallel transmission line 44. A connection terminal 76f located at an end of the connection terminals 76f to 76u is connected to the collector of the output transistor Q2.

A connector 77 has not only connection terminals 77a to 77e having the same function as the above-described connection terminals 37a to 37e according to the first embodiment but also sixteen connection terminals 77f to 77u connected to the downstream side of the parallel transmission line 44. A connection terminal 77f of the connector 77 is connected to a connection terminal 76g of the connector 76, and a connection terminal 77g of the connector 77 is connected to a connection terminal 76h of the connector 76. Similarly, a connection terminal 77t of the connector 77 is connected to a connection terminal 76u of the connector 76. In this way, the parallel connection units of the downstream side and the parallel connection units on the upstream side are connected in such a manner that the wirings of the connection terminals are shifted by one. The parallel transmission line 44 is structured as described above.

In this embodiment, each sensor unit detects a workpiece, and the determination signal is respectively independently transmitted to the network unit 60 via the parallel transmission line 44. The network unit 60 stores the determination signal transmitted via the parallel transmission line 44 to the second area 14-2 of the table memory 14E. In this embodiment, determination information can be transmitted quickly, in a case where the network unit 60 is configured to transmit the determination signal in the second area 14-2 of the table memory 14E to the host apparatus in response to a request from the host control apparatus.

In this embodiment, the first area of the table memory 14E represents a determination state of each sensor unit in synchronization with an update time in the same manner as the first embodiment, and the second area thereof represents a current determination state.

The current determination signal obtained from the parallel transmission line 44 is configured to be once stored in the second area 14-2 of the table memory 14E. Alternatively, the second area 14-2 may not be arranged in the table memory 14E, and the current determination signal may be directly transmitted as a parallel signal to the host control apparatus 42, in which case, the current determination signal of each sensor unit can be transmitted to the host control apparatus 42 in real time.

The continuously-arranged sensor system according to the fifth embodiment has the parallel transmission line in addition to those according to the first embodiment. Alternatively, it is to be understood that the continuously-arranged sensor system according to the fifth embodiment may have the parallel transmission line in addition to those according to the second to fourth embodiments.

(Sixth Embodiment)

Figure 14:
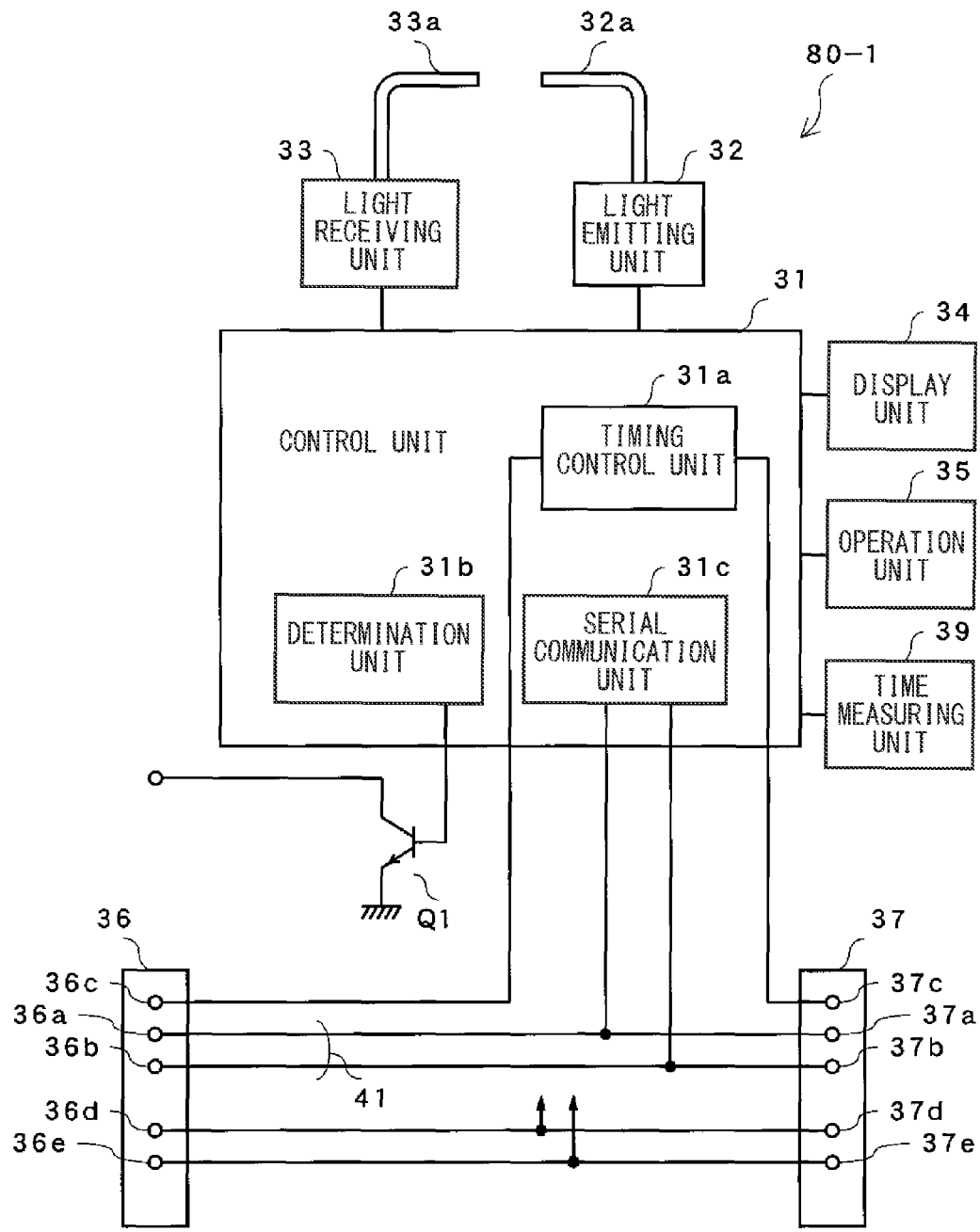
FIG. 14 is a block configuration diagram showing a configuration of a sensor unit in the continuously-arranged sensor system according to the sixth embodiment of the present invention.

In the above-described embodiments, the time measuring unit is arranged on the network unit 10 side. Alternatively, the time measuring unit may be arranged in each sensor unit in the second to fifth embodiments. FIG. 14 is a block diagram for illustrating one example of a sensor unit 80-1 according to the sixth embodiment, which is a variation of the second embodiment. As shown in FIG. 14, a time measuring unit 39 is connected the control unit 31. The control unit 31 simultaneously transmits time information of the time measuring unit 39 via the serial communication unit 31c when the determination signal changes. In response, the network unit 10 stores the time of the change to the table memory 14B as shown in FIG. 4B. In this case, the time measuring unit of the network unit 10 is not necessary. The elimination of the time measuring unit facilitates the processings of the network unit 10.

In the same manner as the sixth embodiment, the third embodiment may be changed in such a way to arrange the time measuring unit in each sensor unit. The control unit 31 is assumed to simultaneously transmit the time information of the time measuring unit 39 via the serial communication unit 31c when the determination signal changes. In response, the network unit can store the fall time and the rising time to the table memory 14C as shown in FIG. 4C.

Further, in the same manner as the sixth embodiment, the fourth embodiment may be changed in such a way to arrange the time measuring unit in each sensor unit. The control unit 31 is assumed to simultaneously transmit the time information of the time measuring unit 39 via the serial communication unit 31c when the determination signal changes. In response, the network unit can store the current output state, the rising time, and the fall time to the table memory 14D as shown in FIG. 4D.

Further, in the same manner as the sixth embodiment, the fifth embodiment may be changed in such a way to arrange the time measuring unit in each sensor unit.

In the above-described continuously-arranged sensor system according to each of the above embodiments, the sensor unit is assumed to be a transparent-type photoelectric sensor unit, but it may be other types of sensor units such as a reflective-type photoelectric sensor unit and a proximity sensor unit. The present invention can be applied to various sensor units for outputting a determination signal based on a detection signal.

In each of the above embodiments, the sixteen sensor units are connected to the network unit, but the continuously-arranged sensor system can be structured by connecting any number of sensor units to the network unit 10.

In the present embodiment, the sensor unit is physically coupled to the network unit and is also electrically connected to the network unit. But a physical coupling and a signal connection may be separated. For example, several sensor units may be coupled with each other, and a signal line may be prepared to connect to another sensor unit.

In the above-described first to fourth embodiments, the serial transmission line is used. In the fifth embodiment, the parallel transmission line is used in addition to the serial transmission line. But the continuously-arranged sensor system can be structured using only the parallel transmission line. In this case, it is necessary to arrange the time measuring unit in the network unit, so that the time measuring unit receives the change of the determination signal from the parallel transmission line and stores the time at that moment to the table memory as shown in FIG. 4A to FIG. 4D.

Industrial Applicability

The present invention relates to a continuously-arranged sensor system for monitoring a state of an object to be detected, and also relates to a network unit and a sensor unit used for this system. The present invention can be preferably used for a continuously-arranged sensor system for processing workpieces in a manufacturing line, because time of a determination signal can be recognized.

What is claimed is:

1. A continuously-arranged sensor system comprising:
a network unit connected to a host control apparatus; and
at least one or more sensor units,
wherein the network unit and any one of the sensor units are physically connected with each other, and the sensor units are physically connected with each other,
wherein the sensor unit includes:
a connection unit for connecting to any one of the adjacent network unit and the adjacent sensor unit;
a sensor unit for outputting a detection signal in accordance with a physical quantity detected from an object;
a time measuring unit for outputting a current time;
a control unit for generating a determination signal upon comparing the detection signal with a predetermined threshold value, and transmitting the determination signal and current time obtained from the time measuring unit;
a serial transmission unit for transmitting and receiving a serial signal including the determination signal output by the control unit and the current time, wherein the serial signal is constituted by a signal including a plurality of bits,
wherein the network unit includes:
a connection unit for connecting to any one of the sensor units that is adjacent to the network unit;
a serial transmission unit for transmitting and receiving a serial signal representing the determination signal of the sensor unit and time information, wherein the serial signal is constituted by a signal including a plurality of bits;
a table memory for memorizing time information of the determination signal sent from each of the sensor units; and
a control unit for receiving the determination signal sent from the coupled sensor unit, and storing, to the table memory, the time information of the change of the determination signal.

2. The continuously-arranged sensor system according to claim 1, wherein the table memory stores the determination signal and a time of a change of the determination signal for each of the sensor units.

3. The continuously-arranged sensor system according to claim 1, wherein the table memory stores a pair of a rising time and a fall time of a judgment signal for each of the sensor units.

4. The continuously-arranged sensor system according to claim 1, wherein the table memory stores a pair of a rising time and a fall time of the determination signal and a judgment signal for each of the sensor units.

5. A network unit used in a continuously-arranged sensor system including a network unit connected to a host control apparatus and at least one or more sensor units, wherein the network unit and any one of the sensor units are physically connected with each other, and the sensor units are physically connected with each other, the network unit comprising:
a connection unit for connecting to any one of the sensor units that is adjacent to the network unit;
a parallel transmission unit for receiving the determination signal transmitted from each of the sensor units via a parallel transmission line in parallel;
a time measuring unit for outputting a current time;
a table memory for memorizing the determination signal transmitted from each of the sensor units and time information of the time measuring unit; and
a control unit for receiving the determination signal of the sensor sent from the coupled sensor units, and storing, to the table memory, the determination signal of the sensor and current time information.

6. The network unit according to claim 5, wherein the control unit of the network unit updates the table memory upon detecting the determination signal generated by the control unit of the sensor unit on the basis of a change in a signal on the parallel signal line.

7. The continuously-arranged sensor system according to claim 5, wherein the table memory stores the determination signal and a time of a change of the determination signal for each of the sensor units.

8. The continuously-arranged sensor system according to claim 5, wherein the table memory stores a pair of a rising time and a fall time of a judgment signal for each of the sensor units.

9. The continuously-arranged sensor system according to claim 5, wherein the table memory stores a pair of a rising time and a fall time of the determination signal and a judgment signal for each of the sensor units.

10. A sensor unit used in a continuously-arranged sensor system including a network unit connected to a host control apparatus and at least one or more sensor units, wherein the network unit and any one of the sensor units are physically connected with each other, and the sensor units are physically connected with each other, the sensor unit comprising:

a connection unit for connecting to any one of the adjacent network unit and the adjacent sensor unit;

a sensor unit for outputting a detection signal in accordance with a physical quantity detected from an object;

a time measuring unit for outputting a current time;

a control unit for generating a determination signal upon comparing the detection signal with a predetermined threshold value, and transmitting the determination signal and the current time obtained from the time measuring unit; and a serial transmission unit for transmitting and receiving a serial signal including the determination signal output by the control unit, wherein the serial signal is constituted by a signal including a plurality of bits.

* * * * *